United States Patent
Tai

(10) Patent No.: US 6,812,275 B1
(45) Date of Patent: Nov. 2, 2004

(54) THERMOPLASTIC RESIN COMPOSITION

(75) Inventor: Toshihiro Tai, Osaka (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 09/869,747

(22) PCT Filed: Nov. 2, 2000

(86) PCT No.: PCT/JP00/07751

§ 371 (c)(1),
(2), (4) Date: Jun. 29, 2001

(87) PCT Pub. No.: WO01/32781

PCT Pub. Date: May 10, 2001

(30) Foreign Application Priority Data

Nov. 2, 1999 (JP) .......................................... 11-312415

(51) Int. Cl.⁷ ................................................ C08K 3/04
(52) U.S. Cl. ........................ 524/495; 524/496; 524/404
(58) Field of Search ................................ 524/414, 417, 524/430, 433, 495, 496; 428/458, 462, 474.4, 323

(56) References Cited

U.S. PATENT DOCUMENTS

| | | | | |
|---|---|---|---|---|
| 5,134,190 A | * | 7/1992 | Kosaka ........................ 524/609 |
| 5,434,209 A | * | 7/1995 | Gareiss ........................ 524/352 |
| 6,075,114 A | * | 6/2000 | Umetsu et al. ............. 528/272 |
| 6,084,012 A | * | 7/2000 | Gareiss et al. ................ 524/80 |
| 6,221,947 B1 | * | 4/2001 | Hironaka .................... 524/405 |

FOREIGN PATENT DOCUMENTS

| | | | |
|---|---|---|---|
| EP | 0 736 568 | | 10/1996 |
| JP | 1-207356 | | 8/1989 |
| JP | 3-182551 | | 8/1991 |
| JP | 7-149891 | | 6/1995 |
| JP | 7-173325 | | 7/1995 |
| JP | 8-27366 | | 1/1996 |
| JP | 11-116825 | | 4/1999 |
| JP | 2000-129148 | | 5/2000 |
| JP | 2000-154316 | | 6/2000 |
| JP | 2000-129148 | * | 9/2000 |

* cited by examiner

Primary Examiner—Katarzyna Wyrozebski
(74) Attorney, Agent, or Firm—Flynn, Thiel, Boutell & Tanis, P.C.

(57) ABSTRACT

A thermoplastic resin composition which has an excellent fluidity and is able to give a molded product having an excellent mechanical strength contains 90–30% by weight of (A) a thermoplastic resin, 5–60% by weight of (B) a fibrous filler and 5–60% by weight of (C) a whisker.

15 Claims, No Drawings

THERMOPLASTIC RESIN COMPOSITION

FIELD OF THE INVENTION

The present invention relates to a thermoplastic resin composition which has an excellent fluidity and is able to form a molded product having a high elasticity.

PRIOR ART

In order to increase the modulus of elasticity of a molded product obtained from a thermoplastic resin, there has been already adopted a method where a filler such as carbon fiber, glass fiber, talc and mica is added. Among these fillers, carbon fiber has been used as the most effective means since the modulus of elasticity inherent thereto is very high and an effect of improving the modulus of elasticity resulting from its addition is high.

However, carbon fiber has a low specific gravity and, when its adding amount increases, its volume fraction in the resin significantly increases as compared with other fillers. Accordingly, as a result, fluidity of the resin lowers and the molding processability lowers. Especially in the case of molded substances (products) obtained from a material where high rigidity is required, many of them are then and, if the fluidity is low, there is a problem in processing. In addition, when reinforcement is carried out by a fibrous filler such as carbon fiber, there is another problem that warping caused by anisotropy in the shrinking rates arises.

DISCLOSURE OF THE INVENTION

An object of the present invention is to provide a thermoplastic resin composition which has none of the above-mentioned problems, shows a good molding ability due to its excellent fluidity and is able to yield a molded product having a high elasticity.

The present invention provides a thermoplastic resin composition comprising 90–30% by weight of (A) a thermoplastic resin, 5–60% by weight of (B) a fibrous filler and 5–60% by weight of (C) a whisker.

Examples of the thermoplastic resin which is the component (A) used in the present invention is one or more selected from a group consisting of a polyamide, styrene polymer, polyester, polyurethane, polyether, polyester ether, polyamide ether, polyphenylene oxide and polycarbonate. Among them, one or more selected from a styrene polymer, polyamide, polyester and polycarbonate are preferable, and a polyamide and a styrene polymer are more preferable.

As the polyamide, one or more selected from a polyamide resin formed from a diamine and a dicarboxylic acid and copolymers thereof such as Nylon 66, polyhexamethylene sebacamide (Nylon 610), polyhexamethylene dodecamide (Nylon 612), polydodecamethylene dodecamide (Nylon 1212), poly-m-xylylene adipamide (Nylon MXD6), polytetramethylene adipamide (Nylon 46) and mixtures and copolymers thereof; a copolymer such as Nylon 6/66, Nylon 66/6T, where a 6T component is not more than 50 molar % (6T: polyhexamethylene terephthalamide), Nylon 66/6I, where a 6I component is not more than 50 molar % (6I: polyhexamethylene isophthalamide), Nylon 6T/6I/66 and Nylon 6T/6I/610; aromatic polyamide resin such as polyhexamethylene terephthalamide (Nylon 6T), polyhexamethylene isophthalamide (Nylon 6I), poly(2-methylpentamethylene) terephthalamide (Nylon M5T) and poly(2-methylpentamethylene) isophthalamide (Nylon M5I); and copolymers such as Nylon 6T/6I and Nylon 6T/M5T may be proposed.

Further, as the polyamide, one or more selected from an open-ring polymer of cyclic lactam, a polycondensate of aminocarboxylic acid and a copolymer thereof such as an aliphatic polyamide resin and copolymers thereof such as Nylon 6, poly-ω-undecanamide (Nylon 11) and poly-ω-dodecamide (Nylon 12); and a copolymer with a polyamide comprising dicarboxylic acid and a diamine such as Nylon 6T/6, Nylon 6T/11, Nylon 6T/12, Nylon 6T/6I/12 and Nylon 6T/6I/610/12 may be proposed.

As the styrene polymer, a polymer of styrene and a styrene derivative such as an a-substituted styrene and a nuclear-substituted styrene and a copolymer prepared from the above monomer with another monomer such as a vinyl compound (including acrylonitrile, acrylic acid and methacrylic acid) and/or a conjugated diene compound (such as butadiene and isoprene) may be proposed. As the styrene polymer, polystyrene, high-impact polystyrene (HIPS), acrylonitrile-butadiene-styrene copolymer (ABS resin), acrylonitrile-styrene copolymer (AS resin), styrene-methacrylate copolymer (MS resin), styrene-butadiene copolymer (SBS resin) etc. Are preferable.

Further, in order to improve the compatibility of the polyamide with the styrene polymer, a styrene copolymer in which a carboxyl-containing unsaturated compound is copolymerized may be compounded as a part of the styrene copolymer.

The styrene copolymer in which the carboxyl-containing unsaturated compound is copolymerized is a copolymer where the carboxyl-containing unsaturated compound and, if necessary, other monomer which is copolymerizable therewith is/are polymerized in the presence of a rubber polymer, and the following may be proposed.

(1) a graft polymer which is prepared by polymerizing a monomer where an aromatic vinyl is an essential component or a monomer where an aromatic vinyl and a carboxyl-containing unsaturated compound are essential components in the presence of a rubber polymer copolymerized with a carboxyl-containing unsaturated copolymer;

(2) a graft copolymer which is prepared by copolymerizing a monomer where an aromatic vinyl and a carboxyl-containing unsaturated compound are essential components in the presence of a rubber polymer;

(3) a mixture of a rubber-enriched styrene resin where a carboxyl-containing unsaturated compound is not copolymerized and a monomer where an aromatic vinyl and a carboxyl-containing unsaturated compound are essential components;

(4) a mixture of the above (1) and (2) and a copolymer where an aromatic vinyl and a carboxyl-containing unsaturated compound are essential components; and (5) a mixture of the above (1)–(4) and a copolymer where an aromatic vinyl is an essential component.

In the above-mentioned (1)–(5), styrene is preferable as an aromatic vinyl, while acrylonitrile is preferable as a monomer which is copolymerized with the aromatic vinyl. The amount of the styrene polymer in which the carboxyl-containing unsaturated compound is copolymerized in the component (A) is preferably 0.1–8% by weight, and more preferably 0.2–7% by weight.

The amount of the component (A) in the composition is 90–30% by weight, preferably 90–40% by weight, and more preferably, 90–50% by weight.

As the fibrous filler which is the component (B) used in the present invention, carbon fiber, glass fiber and other inorganic fibers (such as silicon carbide fiber and alumina fiber) may be proposed. Among them, carbon fiber is preferable when the manufacturing cost and the reinforcing effect are taken into consideration. As the carbon fiber, carbon fibers of a cellulose, a PAN, a pitch etc. May be proposed.

The amount of the component (B) in the composition is 5–60% by weight, preferably 5–50% by weight and more preferably 5–40% by weight, so that the fluidity of the composition and mechanical strength of the molded product, etc. Are synergistically heightened by combination with the component (C).

The whisker which is the component (C) used in the present invention is a component which achieves a synergistic effect by combination with the component (B), particularly with carbon fiber and may be a metal or non-metal. For example, aluminum borate, silicon carbide, silicon nitride, potassium titanate, basic magnesium sulfate, zinc oxide, graphite, magnesia, calcium sulfate, sodium calcium phosphate, magnesium borate, titanium diborate, α-alumina, chrysotile, wollastonite, etc. May be proposed.

Since the whisker is to suppress the increase of the total volume of the composition and to improve the fluidity, the more its specific gravity, the better. The gravity of the whisker is preferably 2 or more, 2.5 or more is more preferable and 2.9 or more is further preferable.

The amount of the component (C) in the composition is 5–60% by weight, preferably 5–50% by weight and more preferably 5–30% by weight, so that fluidity of the composition, mechanical strength of the molded product, etc. Are synergistically heightened by combination with the component (B).

Besides the above components (A)–(C), a flame retardant may also be compounded in the present invention, and as the flame retardant, one or more selected from a red phosphorous flame retardant and a hydrated metal flame retardant are preferable.

Examples of the red phosphorous flame retardant are red phosphorus and a compound containing phosphorus. With regard to red phosphorus, that where yellow phosphorus is converted and then disintegrated, that where the state of white phosphorus before conversion is finely classified and then converted, etc., may be used. That where the surface is untreated and that containing black phosphorus as a result of aged-based change may be also used. With regard to a compound containing phosphorus, that which contains 10% by weight or more phosphorus is preferable. When safety etc. Are taken into consideration, it is preferable that the red phosphorus and phosphorus-containing compound is made into a master batch using a base resin.

As the hydrated metal flame retardant, one or more selected from alkaline metal hydrate, hydrate of an alkaline earth metal such as aluminum hydroxide and magnesium hydroxide, and the like may be proposed. Among them, magnesium hydroxide is preferable.

The amount of the flame retardant in the composition is preferably 5–50 parts by weight, more preferably, 5–20 parts by weight, to 100 parts by weight of the total amount of the components (A)–(C).

If necessary, the composition of the present invention may be further compounded with a flame retardant other than the above-mentioned ones (inorganic flame retardants such as bromine, chlorine and antimony trioxide flame retardants), a stabilizer against heat, light and oxygen (an antioxidant such as a phenol compound and a phosphorus compound; ultraviolet absorber such as a benzotriazole compound, a benzophenone compound and a phenyl salicylate compound; and a stabilizer against heat such as a stabilizer of a hindered amine, a tin compound and an epoxy compound), a plasticizer, a slidability improving agent such as dimethyl polysiloxane, a lubricant or a mold lubricant, an antistatic agent, a coloring agent, etc.

The molded product of the present invention can be prepared by molding the above-mentioned thermoplastic resin composition by means of various molding methods such as an extrusion molding and an injection molding. Further, the molded product of the present invention may, if necessary, be subjected to known metal plating methods such as an electric plating, a nonelectrolytic plating, a melt plating, an impact plating, a vacuum plating and a chemical plating, so that the surface of the molded product is plated with metal. The molded product according to the present invention is useful as housings and parts of electric appliances for home use and office automation instruments, and the metal-plated molded products are particularly excellent in flame resistance.

EXAMPLES

The present invention will now be further illustrated by way of the following Examples. In the following Examples and Comparative Examples, the components which will be given below were used.

Component (A)

Polycarbonate: Number average molecular weight 18000

Nylon 6: Number-average molecular weight 12000

ABS resin: 45% of styrene, 15% of acrylonitrile and 40% of rubber

Maleic acid-modified ABS resin: 42% of styrene, 15% of acrylonitrile, 40% of rubber and 3% of maleic acid Component (B)

Carbon fiber: Besfight HTA-C6-NR (diameter: 7μm; fiber length: 6mm)

Component (C)

Aluminum borate whisker: Alborex Y

Flame Retardant

Red phosphorous flame retardant: Novaexcel 140 (manufactured by RINKAGAKUKOGYO Co., LTD)

Magnesium hydroxide: Kisuma 5A (manufactured by KYOWA Chemical Industry Co., LTD)

Examples 1–3 and Comparative Examples 1–6

The components as shown in Table 1 (components (A)–(C) are given in % by weight, while flame retardant is given in terms of parts by weight to the components (A)–(C)) were blended and then melted and kneaded using a biaxial extruder, to give a resin composition in a form of pellets. Temperature for the extrusion molding was 250° C., the carbon fiber was poured from a side feeder and length of the carbon fiber was adjusted by an operation of a screw of the extruder. Those compositions were used for the measurements as shown in Table 1 by the following methods. (Modulus of flexural elasticity; Izod Impact Value; and Warp)

A test piece having a thickness of ¼ inch for a flexural test, a test piece having a thickness of ¼ inch with a notch for an Izod test and a plate of 120 mm×120 mm×2 mm for evaluation of warp (dimension stability) were prepared from the resin composition pellets using an injection molding machine (cylinder temperature: 250° C.; metal mold temperature: 60° C.; type 265/100M SII manufactured by Mitsubishi Heavy Industries). The flexural test and the Izod impact test were carried out according to ASTM D790 and ASTM D256, respectively. While the warp amount was measured at 23° C. and 50% relative humidity using a height gauge.

Fluidity

Fluidity was evaluated by means of a melt index and was carried out according to ASTM D1238. The measurement was carried out at 280° C. and the total weight of the weigh and the piston was 10 kg.

Flame Resistance

A test piece of 13×130×0.8 mm was used to evaluate its flame resistance according to a vertical flame resistance test (94V-0) defined in UL94 of the American UL standard.

As will be apparent from the comparison of Example 1 with Comparative Examples 1 and 2, that of Example 2 with Comparative Examples 3 and 4 and that of Example 3 with Comparative Examples 5 and 6, the compositions of Examples 1–3 showed well-balanced results in all measured items due to the presence of both components (B) and (C) therein as compared with Comparative Examples 1–6 containing only one of them. Fluidity showed particularly significant improvement due to a combination of the components (B) and (C) and, when the facts that application to thin substances becomes easier as a result of improvement in the molding property and that mechanical strength of the thin substance is high are taken into consideration, the industrial effect is remarkable.

In the thermoplastic resin composition of the present invention, fluidity of the composition is improved by a synergistic effect of the component (B), particularly carbon fiber, with the component (C) whereby the modulus property is good, mechanical strength, such as modulus of flexural elasticity and high impact strength, is improved and no warping results in the molded product.

group consisting of a red phosphorus flame retardant and a hydrated metal flame retardant.

5. The metalized molded product of claim 1, wherein the thermoplastic resin is at least one member selected from the group consisting of a polyamide and an ABS resin.

6. The metalized molded product of claim 5, wherein the thermoplastic resin is an ABS resin.

7. The metalized molded product of claim 4, wherein the flame retardant is a hydrated metal flame retardant.

8. The metalized molded product of claim 1, wherein the thermoplastic resin composition comprises 90–30% by weight of (A) a thermoplastic resin comprising at least one member selected from the group consisting of a polyamide and a styrene polymer, 5–60% by weight of (B) carbon fiber, 5–60% by weight of a whisker having a specific gravity of at least 2 and a flame retardant comprising at least one member selected from the group consisting of a red phosphorus flame retardant and a hydrated metal flame retardant.

9. The metalized molded product of claim 8, wherein the thermoplastic resin is an ABS resin and the flame retardant is a hydrated metal flame retardant.

10. The metalized molded product of claim 1, wherein the styrene polymer is selected from the group consisting of high-impact polystyrene, acrylonitrile-butadiene-styrene copolymer and styrene-butadiene copolymer.

11. The metalized molded product of claim 1, wherein the polyamide is nylon 6, the styrene polymer is an acrylonitrile-butadiene-styrene copolymer and the copolymer of a carboxy group-containing unsaturated compound and styrene is a maleic acid-modified acrylonitrile-butadiene-styrene copolymer.

12. The metalized molded product of claim 1, wherein the fibrous filler is a carbon filler and the whisker is aluminum borate whisker.

TABLE 1

| | | Example | | | Comparative Example | | | | | |
|---|---|---|---|---|---|---|---|---|---|---|
| | | 1 | 2 | 3 | 1 | 2 | 3 | 4 | 5 | 6 |
| (A) | Polycarbonate | 50 | | | 50 | 40 | | | | |
| | Nylon 6 | | 35 | 28 | | | 35 | 35 | 28 | 28 |
| | ABS resin | | 8 | 6 | | | 8 | 8 | 6 | 6 |
| | Maleic acid-modified ABS resin | | 7 | 6 | | | 7 | 7 | 6 | 6 |
| (B) | Carbon fiber | 30 | 30 | 30 | 50 | | 50 | | 50 | |
| (C) | Aluminum borate whisker | 20 | 20 | 20 | | 60 | | 60 | | 60 |
| Red phosphorous flame retardant | | | | 5 | | | | | 5 | 5 |
| Magnesium hydroxide | | | | 5 | | | | | 5 | 5 |
| Modulus of flexural elasticity (MPa) | | 18000 | 25000 | 24500 | 24000 | 25000 | 25000 | 25000 | 25500 | 24500 |
| Izod Impact Strength (J/m) | | 50 | 98 | 88 | 45 | 30 | 80 | 28 | 60 | 25 |
| Warp (mm) | | 0.6 | 0.6 | 0.5 | 2.2 | 0.3 | 2.5 | 0.3 | 2.3 | 0.3 |
| Fluidity (MI) (g/10 min) | | 22 | 40 | 35 | 5 | 15 | 18 | 20 | 22 | 25 |
| Flammability 0.8 mm | | Spec Out | Spec Out | V-0 | Spec Out | Spec Out | Spec Out | Spec Out | V-0 | V-0 |

What is claimed is:

1. A metalized molded product comprising a molded product made of a thermoplastic resin composition comprising 90–30% by weight of (A) a thermoplastic resin consisting of a blend of (1) a polyamide, (2) a styrene polymer selected from the group consisting of high-impact polystyrene, an acrylonitrile-butadiene-styrene copolymer, an acrylonitrile-styrene copolymer and a styrene-butadiene copolymer and (3) a copolymer of a carboxy group-containing unsaturated compound and styrene, 5–60% by weight of (B) a fibrous filler and 5–60% by weight of (C) a whisker and a metal plating provided on the molded product.

2. The metalized molded product of claim 1, wherein the fibrous filler is carbon fiber.

3. The metalized molded product of claim 1, wherein the thermoplastic resin composition further comprises a flame retardant.

4. The metalized molded product of claim 3, wherein the flame retardant is at least one member selected from the 13. The metalized molded product of claim 3, wherein the flame retardant is a hydrate of an alkali metal or an alkaline earth metal.

14. The metalized molded product of claim 3, wherein the flame retardant is magnesium hydroxide.

15. The metalized molded product of claim 1, wherein the polyamide is nylon 6, the styrene polymer is an acrylonitrile-butadiene-styrene copolymer, the copolymer of a carboxy group-containing unsaturated compound and styrene is a maleic acid-modified acrylonitrile-butadiene-styrene copolymer, the filler is carbon fiber, the whisker is aluminum borate whisker and a red phosphorus flame retardant is present in the thermoplastic resin composition.

* * * * *